(12) United States Patent
Dier

(10) Patent No.: US 8,747,664 B2
(45) Date of Patent: Jun. 10, 2014

(54) WATER FILTRATION AND STERILISATION DEVICE

(75) Inventor: Christopher Dier, Windsor (GB)

(73) Assignee: Applica Cosumer Products, Inc., Miramar, FL (US)

( * ) Notice: Subject to any disclaimer, the term of this patent is extended or adjusted under 35 U.S.C. 154(b) by 1399 days.

(21) Appl. No.: 12/514,839

(22) PCT Filed: Nov. 13, 2007

(86) PCT No.: PCT/IB2007/003458
§ 371 (c)(1),
(2), (4) Date: Jun. 8, 2011

(87) PCT Pub. No.: WO2008/059340
PCT Pub. Date: May 22, 2008

(65) Prior Publication Data
US 2012/0061301 A1    Mar. 15, 2012

(30) Foreign Application Priority Data
Nov. 14, 2006    (GB) .................................. 0622705.2

(51) Int. Cl.
*B01D 27/00*    (2006.01)
*C02F 9/12*    (2006.01)
(52) U.S. Cl.
USPC ........... 210/109; 210/134; 210/138; 210/143; 210/192; 210/258
(58) Field of Classification Search
USPC ......... 210/109, 110, 134, 138, 141, 143, 192, 210/257.1, 257.2, 258–262, 295, 464–482; 222/189.06; 422/186.3
See application file for complete search history.

(56) References Cited

U.S. PATENT DOCUMENTS

| | | | | |
|---|---|---|---|---|
| 4,615,799 A * | 10/1986 | Mortensen | .................... | 210/177 |
| 4,849,100 A * | 7/1989 | Papandrea | .................... | 210/138 |
| 4,902,411 A * | 2/1990 | Lin | ................................ | 210/104 |
| 4,909,931 A * | 3/1990 | Bibi | ............................... | 210/85 |
| 5,254,242 A * | 10/1993 | van der Meer et al. | ......... | 210/91 |
| 5,384,032 A * | 1/1995 | de Souza | ....................... | 210/104 |
| 5,445,729 A * | 8/1995 | Monroe et al. | .................. | 210/86 |
| 5,817,231 A * | 10/1998 | Souza | .......................... | 210/96.2 |

(Continued)

FOREIGN PATENT DOCUMENTS

WO    0162672 A1    8/2001

OTHER PUBLICATIONS

An Examination Report, dated May 6, 2011, for copending GB application No. GB0622705.2 (3 pages).

(Continued)

*Primary Examiner* — Joseph Drodge
(74) *Attorney, Agent, or Firm* — Armstrong Teasdale LLP

(57) ABSTRACT

The present invention provides a water filtration and sterilization device comprising a container having an inlet conduit and an outlet conduit, a closure valve at said inlet conduit, a filter means upstream of said inlet conduit, a flow prevention means in said outlet conduit and an ultra violet radiation source within said container. The valve is adapted to be opened for a first time period to admit water into the container via the filter means. The ultra violet radiation source is operable for a second time period to sterilize water in said chamber. The first time period is shorter than said second time period. The flow prevention means is operable to deliver sterilized water on demand from the container.

14 Claims, 2 Drawing Sheets

(56) References Cited

U.S. PATENT DOCUMENTS

| | | | |
|---|---|---|---|
| 5,853,572 A * | 12/1998 | Kuennen et al. | 210/87 |
| 6,451,202 B1 * | 9/2002 | Kuennen et al. | 210/136 |
| 6,797,165 B2 * | 9/2004 | Harrison | 210/232 |
| 6,936,176 B1 * | 8/2005 | Greene, III et al. | 210/702 |
| 7,226,536 B2 | 6/2007 | Adams | 210/202 |
| 7,470,364 B2 * | 12/2008 | Oranski et al. | 210/198.1 |
| 2004/0149643 A1 * | 8/2004 | Vandenbelt et al. | 210/282 |
| 2005/0247609 A1 * | 11/2005 | Laing et al. | 210/109 |
| 2007/0209984 A1 * | 9/2007 | Lev et al. | 210/143 |
| 2008/0314807 A1 * | 12/2008 | Junghanns et al. | 210/85 |
| 2010/0133155 A1 * | 6/2010 | Nolan | 210/98 |

OTHER PUBLICATIONS

An Examination Report, dated Jan. 17, 2011, for copending GB application No. GB0622705.2 (2 pages).

* cited by examiner

WATER FILTRATION AND STERILISATION DEVICE

CROSS-REFERENCE TO RELATED APPLICATIONS

This application is a U.S. national stage application of International Application No. PCT/IB2007/003458 filed Nov. 13, 2007, which designates the United States of America, and claims priority to Great Britain application number 0622705.2 filed Nov. 14, 2006. The contents of which are hereby incorporated by reference in their entirety.

TECHNICAL FIELD OF THE INVENTION

The present invention relates to a water filtration and sterilisation device and particularly to a domestic water filtration and sterilisation device.

BACKGROUND

A domestic water filtration jug typically comprises a jug body into the upper region of which there is nested an inlet container having a removable filtration element. Water, for example tap water, can be introduced into the container whereupon it is fed by gravity through the filtration element to the lower region of the jug body. The filtration element may contain an appropriate filtration means such as, for example, an activated carbon bed or an ion exchange matrix. The filtered water can be retained in the lower region of the jug body until it is poured therefrom by tipping the jug body.

The nesting of the inlet container within the jug body means that the jug body can only ever be partially filled as around half of the jug body is taken up by the inlet container. A user may typically keep the filtration jug in their refrigerator. It will thus be appreciated that a conventional filtration jug thus wastes space within the refrigerator. The filtration element typically only removes particles, chemicals and heavy metals as water passes from the inlet container to the lower region of the jug body. The filtration element thus does not remove biological contaminants such as, for example, bacteria. A further drawback is that the filtered water may be kept in the lower region of the jug body for a prolonged period of time during which it may lose its freshness, for example by coming into contact with airborne contaminants.

SUMMARY OF THE INVENTION

According to the present invention there is provided a water filtration and sterilisation device comprising a container having an inlet conduit and an outlet conduit, a closure valve at said inlet conduit, a filter means upstream of said inlet conduit, a flow prevention means in said outlet conduit and an ultra violet radiation source within said container, whereby the valve is adapted to be opened for a first time period to admit water into the container via the filter means, the ultra violet radiation source is operable for a second time period to sterilise water in said chamber, and said flow prevention means is operable to deliver sterilised water on demand from the container, wherein said first time period is shorter than said second time period.

The present invention thus provides a device which is operable to both filter and sterilise water prior to it being dispensed to a user.

The flow prevention means may comprise a valve which is operable by a user of the device to selectively permit or block the flow of water through the outlet conduit. The valve may be manually operable and, for example, may take the form of a simple tap fitting. In an alternative embodiment, the valve may be electrically operable. The flow prevention means may alternatively take the form of a pump which, when not in operation, prevents the flow of water through the outlet conduit. The pump is preferably electrically operable.

The first and second time periods commence simultaneously. For example, a user may operate a switch or depress a button in order to both open the valve and operate the ultra violet radiation source. Where a pump is provided, the pump is preferably operable to draw residual water present in the outlet conduit from the outlet conduit to the container. The pump may operate in this manner during periods when the ultra violet radiation source is illuminated and ensures that any water that may have been sitting in the outlet conduit is removed therefrom and re-sterilised. The device preferably has a standby mode whereupon the pump periodically operates to draw residual water from the outlet conduit In the standby mode the ultra violet radiation source may operate periodically to sterilise water present within the container.

The device preferably includes a further container for untreated water which is in fluid communication with the inlet conduit. The further container may be filled with untreated water from any appropriate source such as, for example, a tap or faucet. The further container is preferably positioned above the container and may be at least partially received within the container. The further container is preferably arranged to supply water to the container by gravity. Both containers may be provided within a protective casing which serves, in use, to locate the containers in the correct position relative to one another. The containers are advantageously removable from the casing and, where appropriate, each other to facilitate cleaning.

The filter means is preferably mounted to the further container and may comprises a replaceable casing containing filter media. The outlet conduit may comprise a flexible plastics tube.

In a preferred embodiment the valve is electrically operable and is biased to a closed position.

The device preferably includes a removable jug into which said outlet opens and into which filtered and sterilised water can be dispensed.

DETAILED DESCRIPTION OF THE INVENTION

Figure 1:
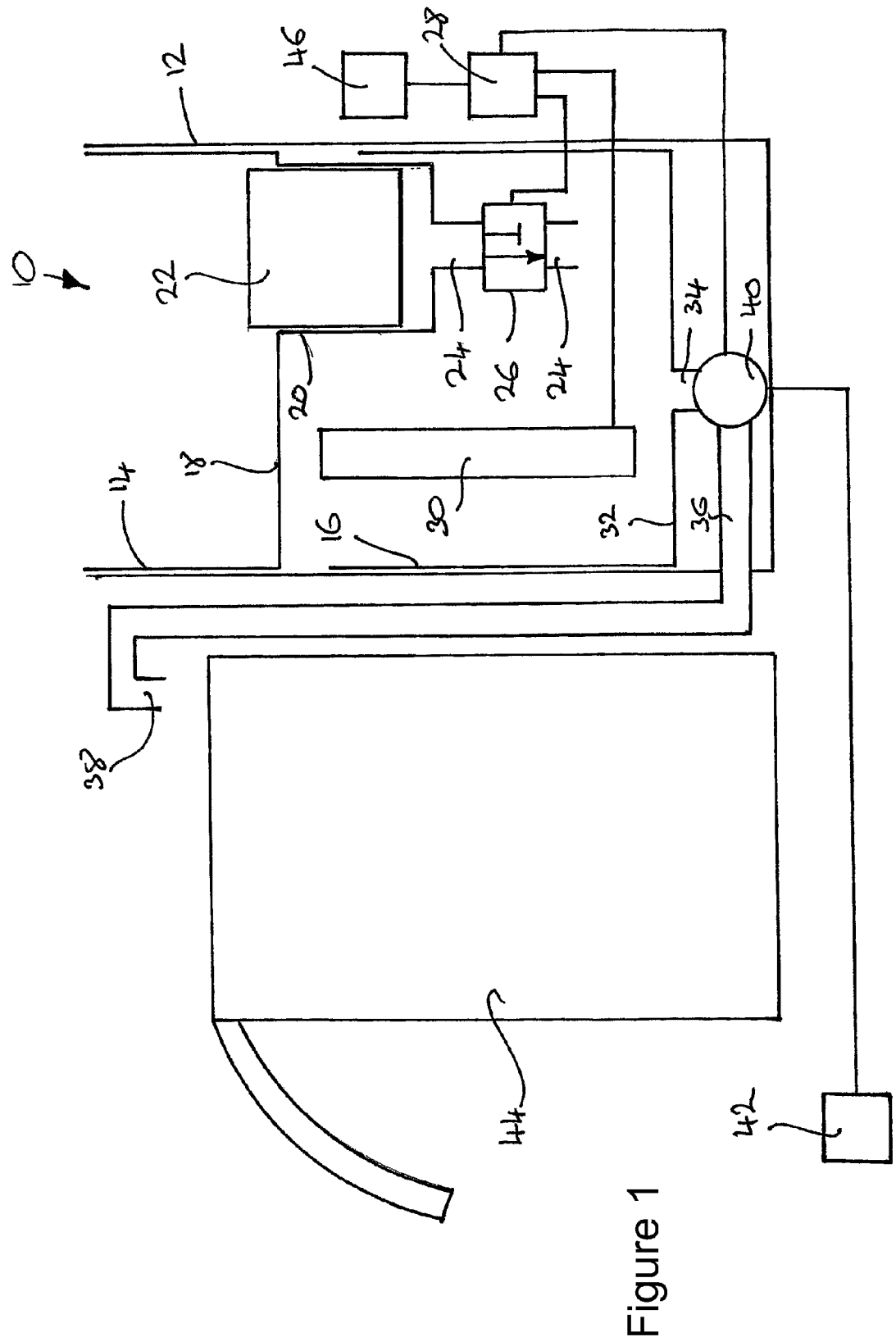
FIG. 1 shows a schematic cross-sectional view of a water filtration and sterilisation device according to the present invention.
Figure 2:
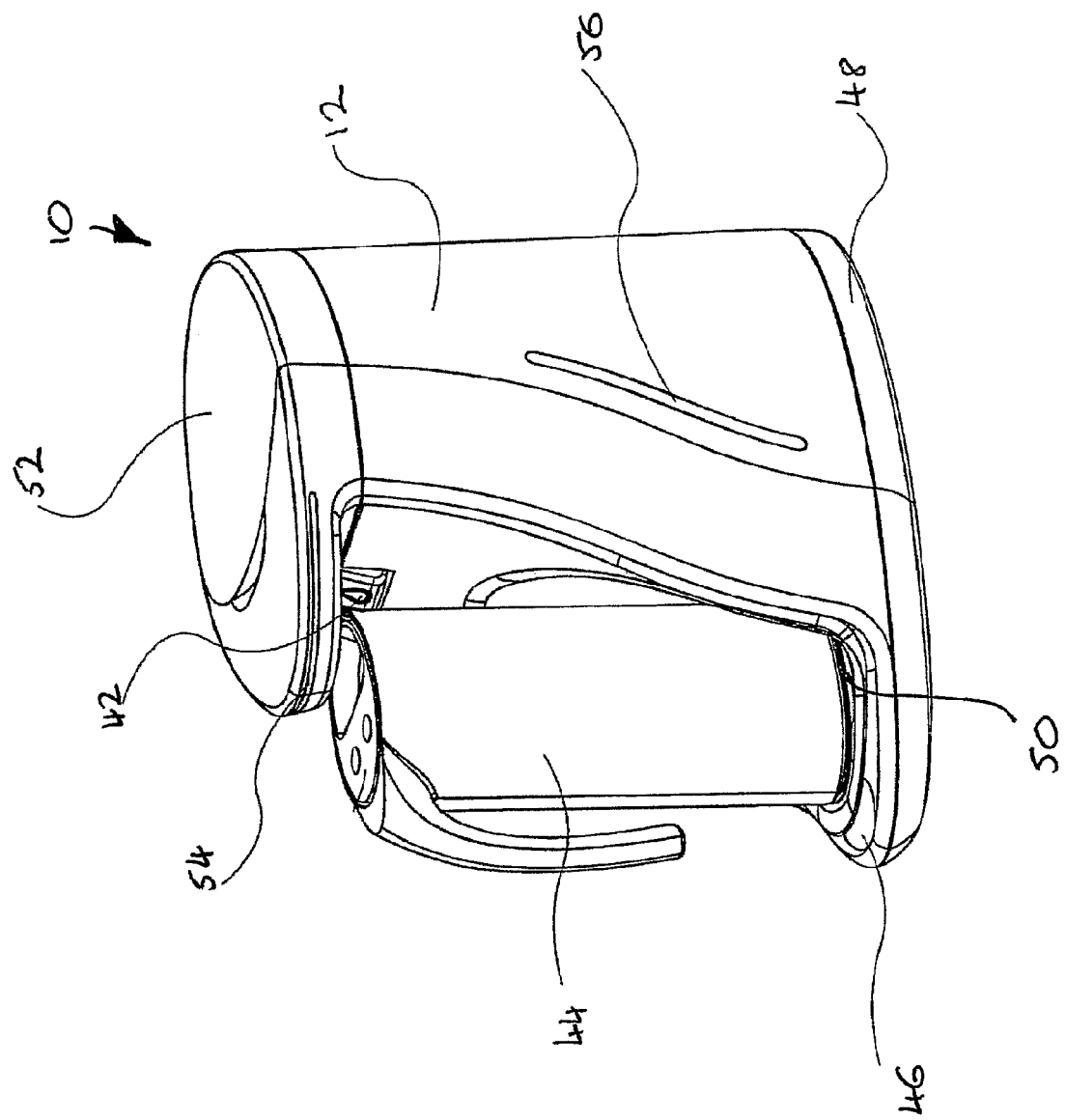
FIG. 2 shows an external perspective view from above and to one side of a water filtration and sterilisation device according to the present invention.

An embodiment of the present invention with reference to the accompanying drawings in which: FIG. 1 shows a schematic cross-sectional view of a water filtration and sterilisation device according to the present invention; and FIG. 2 shows an external perspective view from above and to one side of a water filtration and sterilisation device according to the present invention.

Referring firstly to FIG. 1 there is shown a water filtration and sterilisation device generally designated 10. The device includes a casing 12 within which there are provided upper and lower containers 14,16. Advantageously the upper container 14 has a volume which is substantially equal to that of the lower container 16. The casing 12 may be provided with a removable lid (not shown) which covers and closes the upper container 14. FIG. 1 shows the containers 14,16 being positioned one above the other. In an alternative embodiment the upper container 14 may be nested within the lower container 16 in the same manner as a conventional water filter jug. The base 18 of the upper container 14 is provided with a recess 20 within which there is provided a removable filtration cartridge 22. The filtration cartridge 22 contains a filtration medium which, in use, removes particulate matter, chemicals and metals from water passing therethrough.

The recess 20 is provided with an outlet conduit 24 which permits fluid passing through the cartridge 22 to pass to the lower container 16. Within the outlet conduit 24 there is provided a valve 26 which is operable to open and close the outlet conduit 24 and thereby selectively permit or prevent the flow of water from the upper container 14 to the lower container 16. The valve 26 is biased to a closed condition and is electrically movable to an open condition by a controller 28 as will be described in greater detail below.

Within the lower container 16 there is provided a short wave (UVC) ultra violet lamp 30. The lamp 30 is operable by the controller 28 as will be described in greater detail below. The base 32 of the lower container 16 is provided with an outlet 34 which is in fluid communication with an outlet conduit 36 which terminates at a spout 38. The outlet conduit 36 may comprise a flexible plastic tube. Within the outlet conduit 36 between the lower container outlet 34 and the spout 38 there is provided an electrically operable pump 40. The pump 40 is operable to move water from the lower container 16, through the outlet conduit 36 to the spout 38. The pump 40 is also operable in the reverse direction to return water from the outlet conduit 36 to the lower container 16. The pump 40 may be operated by a user depressing a pump switch 42. The pump 40 may also be operated by the controller 28. The operation of the pump 40 will be described in greater detail below. The pump 40 may be considered to be optional and is necessitated by the provision of the spout 38 at height which is above that of the lower container 16. In an alternative embodiment, liquid may be removed from the lower container 16 under the influence of gravity. In such an embodiment the outlet conduit 36 may be provided with a user operable valve to control the flow of liquid through the outlet conduit 36.

The spout 38 is positioned so as to supply water from the lower container 16 to a receptacle such as a jug 44.

In use, a volume of water, such as tap water, is introduced into the upper container 14. The water is prevented from passing through the filtration cartridge 22 to the lower container 16 by the valve 26 which is initially in the closed position. The water is retained in the upper container 14 until an actuation switch 46 is depressed by the user. The depression of the actuation switch 46 causes the controller 28 to move the valve 26 to the open position and thereby permit water to flow from the upper container 14 to the lower container 16 through the filtration cartridge 22.

The controller 28 simultaneously operates the pump 40 in the reverse direction for a short time period, and operates the lamp 30 to sterilise water contained in the lower container 16. The pump 40 is operated in the reverse direction so as to draw back into the lower container 16 any water which may be contained within the outlet conduit 36. The casing 12 may be provided with an indicator (not shown), such as an LED, which illuminates to indicate that the lamp 30 is active and hence ultra violet sterilisation of water within the lower container 16 is taking place. In this state the device 10 may be considered to be in a 'cleaning' mode.

The controller 28 may maintain the valve 26 in the open position for a set time period. The time period is chosen so as to ensure that all of the water introduced into the upper container 14 is able to pass into the lower container. For example, the time period may be in the region of five minutes. In an alternative embodiment, the upper container 14 may be provided with a level or weight sensor which is able to determine the volume of water introduced into the upper container 14. The sensed volume may then be utilised by the controller 28 to calculate the time period for which the valve 26 remains open.

The controller 28 operates the lamp 30 for a time period which is greater than the time period for which the valve 26 is kept open. As before, the controller 28 may operate the lamp 30 for a set time period, for example eight minutes.

Alternatively, the controller 28 may operate the lamp 30 for a time period which is calculated in response to the volume of water which is determined to have been introduced into the upper container 14.

Once the lamp 30 has been operated for the desired time period, the controller 28 switches off the lamp. The water in the lower container 16 is thus ready to be dispensed. The LED indicator may illuminate in a different colour to that of the 'cleaning' mode to indicate to the user that the water is ready to be dispensed. A user can dispense the water from the lower container 16 to the jug 44 by depressing the pump switch 42 to operate the pump 40. The lower container 16 can be provided with a sensor in order to sense presence to water therein. In the event that a user does not immediately dispense the water from the lower container 16, or dispenses only a portion of the water, the controller 28 causes the lamp 30 to illuminate periodically, for example every thirty minutes or so, so as to maintain the sterility of the water in the lower container 16. The controller 28 preferably also operates the pump 40 in the reverse direction to return any water in the outlet conduit 36 to the lower container 16. In this mode the device 10 may be considered to be in a 'standby' mode. Once the lower container 16 has been emptied the controller 28 is reset ready for the next volume of water to be introduced into the upper container 14.

Referring now to FIG. 2 there is shown an exterior view of an embodiment of the water filtration and sterilisation device 10. Features described above with reference to FIG. 1 are identified with like reference numerals. The casing 12 is provided with a base 48 having a seat 50 upon which the jug 44 may rest. The casing 12 is further provided with a removable lid 52 which, when removed, permits access to the upper container 14. The upper region of the casing 12 further includes a projection 54 which overlies the top of the jug 44 and within which the spout 28 is provided. The pump switch 42 is positioned below the projection 54 and adjacent the spout of the jug 44. The pump switch 42 can thus be operated by contact with the jug spout. The lower region of the casing 12 is provided with a water level gauge 56 which indicates the water level within the lower container 16.

What is claimed is:

1. A water filtration and sterilisation device, comprising:
a casing comprising a first container and a second container within the casing, the first container and the second container each being configured to contain water therein, the first container comprising a base having a recess, the recess comprising a first outlet conduit in fluid communication between the first container and the second container, the second container having an outlet and a second outlet conduit;
a closure valve coupled to said first outlet conduit;
a filter upstream of said first outlet conduit;

a flow prevention means coupled between said second container outlet and said second outlet conduit;
an ultra violet radiation source within said second container; and
a controller, wherein the controller is configured to:
open the closure valve for a first time period to admit water into the second container via the filter;
operate the ultra violet radiation source for a second time period to sterilise water in the second container; and
operate said flow prevention means to deliver sterilised water on demand from the second container; and
wherein said first time period is shorter than said second time period.

2. A device as claimed in claim 1 wherein the controller is further configured to simultaneously open the closure valve for a first time period and operate the ultra violet radiation source for a second time period.

3. A device as claimed in claim 1 wherein the flow prevention means comprises a pump.

4. A device as claimed in claim 3 wherein the controller is further configured to operate the pump to draw residual water present in the second outlet conduit from the second outlet conduit to the second container.

5. A device as claimed in claim 4 wherein the controller is further configured to periodically operate the pump to draw residual water from the second outlet conduit to the second container.

6. A device as claimed in claim 1 wherein the controller is further configured to periodically operate the ultra violet radiation source to sterilise water present within the second container.

7. A device as claimed in claim 1 wherein the first container is positioned above the second container.

8. A device as claimed in claim 1 wherein the first container is at least partially received within the second container.

9. A device as claimed in claim 1 wherein the filter is mounted within the recess of the first container.

10. A device as claimed in claim 1 wherein the first container is arranged to supply water to the second container by gravity.

11. A device as claimed in claim 1 wherein the filter comprises a replaceable casing containing filter media.

12. A device as claimed in claim 1 wherein the second outlet conduit comprises a flexible plastics tube.

13. A device as claimed in claim 1 wherein the closure valve is electrically operable and is biased to a closed position.

14. A device as claimed in claim 1 and including a removable jug into which said second outlet conduit opens.

* * * * *